A. B. CADMAN.
TRAILER TRUCK.
APPLICATION FILED JAN. 28, 1918.
1,393,497.
Patented Oct. 11, 1921.
2 SHEETS—SHEET 1.
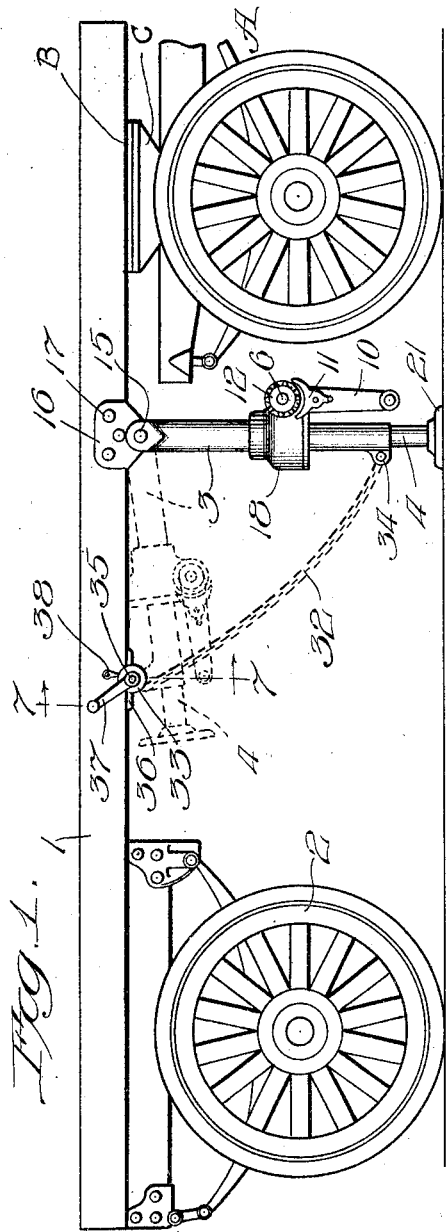
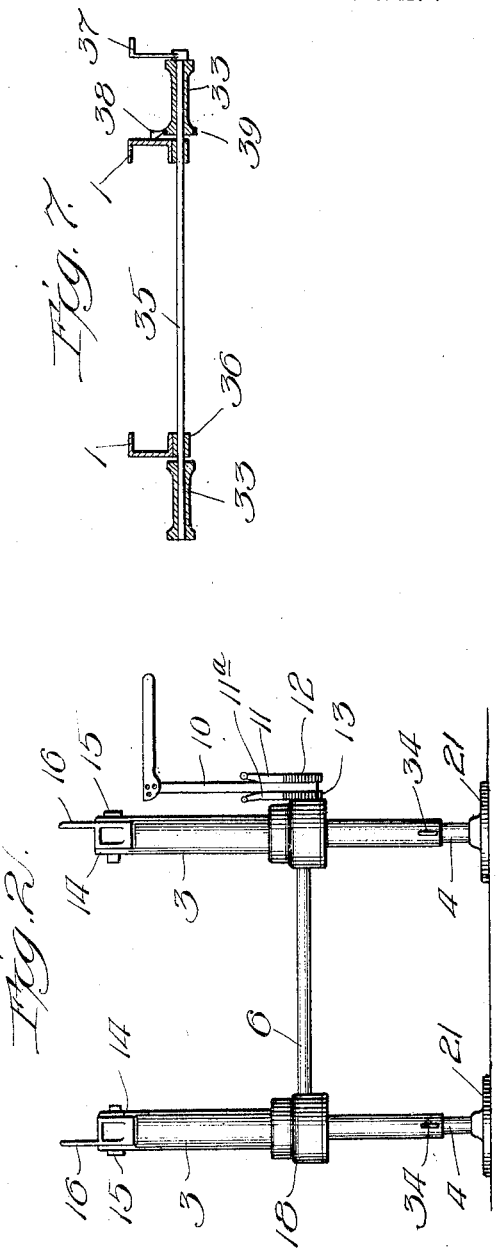
Witness
Harry S. Gaither
Inventor:
Addi Benjamin Cadman
By Miller Chindahl Parken
Attys

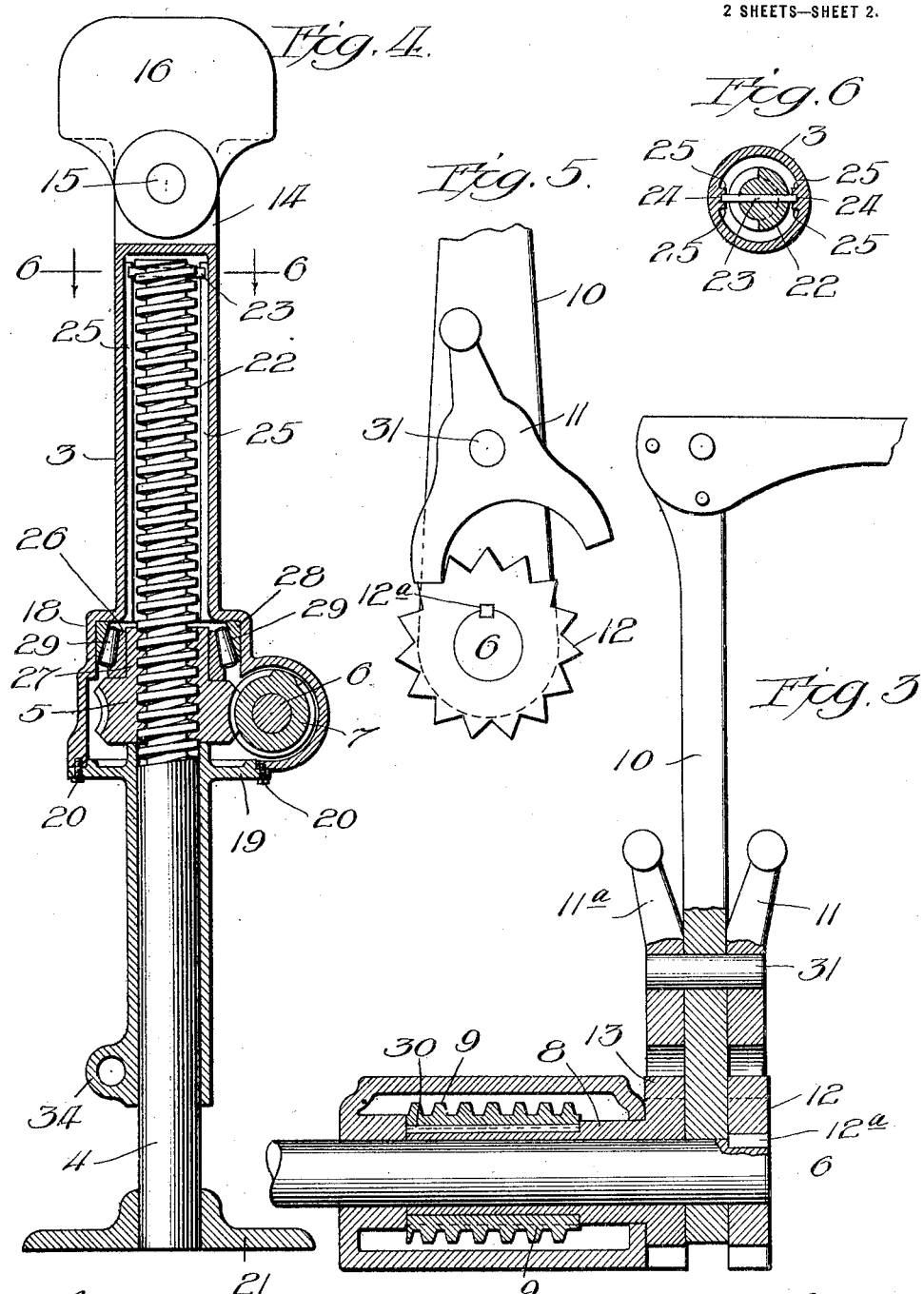

UNITED STATES PATENT OFFICE.

ADDI BENJAMIN CADMAN, OF BELOIT, WISCONSIN, ASSIGNOR TO WARNER MANUFACTURING COMPANY, OF SOUTH BELOIT, WISCONSIN, A CORPORATION OF WISCONSIN.

TRAILER-TRUCK.

1,393,497.   Specification of Letters Patent.   Patented Oct. 11, 1921.

Application filed January 28, 1918. Serial No. 214,092.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer-Trucks, of which the following is a specification.

The invention relates to trailer trucks of the two-wheel type and more particularly to means for supporting the trailer from the ground to prevent it from tilting about its axle when the drawing vehicle is detached from the trailer.

One object of the invention is to provide an improved standard for a trailer truck of the character stated which is capable of raising the frame of the trailer out of engagement with the drawing unit so that the trailer may be readily detached therefrom, of supporting the frame in such position, or of lowering the frame again into engagement with the drawing unit for connection therewith.

Another object of the invention is to provide improved means for supporting the opposite sides of a trailer truck in level position upon the ground even though the ground be rough and not level.

Another object of the invention is to provide supporting standards for the opposite sides of a trailer arranged to be operated either simultaneously or independently by means mounted upon a single operating shaft.

A further object of the invention is to provide improved means for moving the supporting standards from operative to inoperative position and holding them in inoperative position.

The objects of the invention thus generally stated, together with other and ancillary advantages, are attained by the construction and arrangement illustrated in the accompanying drawings forming part hereof, in which Figure 1 is a side elevation of a trailer truck embodying my invention with the forward end of the truck mounted upon the rear end of a drawing unit, the supporting standards being shown in operative position and their inoperative position being shown in dotted lines. Fig. 2 is a rear elevation of the supporting standards detached from the trailer. Fig. 3 is a fragmental elevation-section of a portion of the operating mechanism for the standards. Fig. 4 is a vertical sectional view through the standard shown at the left of Fig. 2. Fig. 5 is a fragmental side elevation of a portion of the operating mechanism. Fig. 6 is a transverse section through one of the standards on line 6—6 of Fig. 4. Fig. 7 is a sectional view taken in the plane of line 7—7 of Fig. 1 and showing the means for swinging the standards into inoperative position and for holding them in such position.

In the drawings, 1 indicates a trailer truck frame mounted near its rear end upon a single pair of wheels 2 and having its forward end suitably mounted upon the rear end of a motor truck A. Herein, by way of example, I have indicated a fifth wheel construction for supporting the frame upon the truck A comprising an upper section B secured to the trailer frame and a lower section C mounted upon the truck. The lower section may have a universal connection with the motor truck of such construction as to enable the two sections to remain in contact while allowing the necessary relative movement in all directions between the trailer frame and the motor truck. The patricular mounting of the frame upon the truck, however, forms no part of the present invention and hence need not be illustrated and described herein in detail.

The standards, which are arranged to coöperate with the wheels 2 to support the trailer when the drawing unit is detached therefrom, each comprises a tubular or outer section 3 pivoted to the frame, a telescoping or inner section 4 within the outer section and a worm wheel 5 threaded upon the upper portion of the inner section. A shaft 6 has a worm 7 (Fig. 4) on one end meshing with the worm wheel 5 of one of said standards, and a sleeve 8 (Fig. 3) rotatable on the other end of said shaft 6 has a worm 9 fixed thereon and meshing with the worm wheel 5 of the other one of said standards. A crank 10 is also rotatably mounted on said shaft 6 and has pivoted thereto a pair of double pawls 11 and 11ª arranged to engage with ratchet wheels 12 and 13 fixed respectively to the shaft 6 and sleeve 8.

The outer section 3 of the standard is provided on opposite sides of its upper end with a pair of upstanding ears 14 between which is pivotally mounted on a pivot pin 15 a bracket 16 arranged to be secured to the side of the frame 1 as by means of rivets 17.

Near its central portion said outer section 3 is enlarged to form a housing 18 within which the worm wheel 5 is arranged to operate; and for convenience in assembling the parts the lower portion of said outer section is made separate from the upper portion and is provided with a plate 19 at its upper end, which is arranged to coöperate with the lower end of the upper portion to complete the housing, said plate being secured to the lower end of the upper portion of the section, as by means of screws 20.

The inner or telescoping section 4 of each standard is in the form of a round bar having a flat base 21 at its lower end and its upper portion is spirally threaded as at 22 and has mounted thereon the worm wheel 5. Said wheel is correspondingly threaded and when rotated through the medium of the shaft 6 and worm 7 is arranged to lower and raise the inner section or bar of the standard.

Preferably means are provided for preventing the rotation of the inner section 4 with reference to the outer section when said worm wheel is rotated. Said means comprises a pin 23 fixed transversely in the upper end of the telescoping section and having each end extending into a vertical guide groove 24 formed within the outer section 3 at each side thereof as by means of a pair of ribs 25.

Means are also preferably provided for receiving the upward thrust of the worm wheel 5 in the operation of the standard. Said means comprises a bearing having an inner ring 26 fixed upon a hub 27 on the worm wheel 5, an outer ring 28 fixed within the housing 18 of the standard, and roller bearings 29 arranged to operate between the rings.

The opposite ends of the operating shaft 6 are arranged to bear in the housings 18 of the standards into which they extend at opposite sides of the frame, and the worm 7 is fixed on one end of said shaft and meshes with the worm wheel 5 of one of the standards; and on the other end of the shaft the sleeve 8 is rotatably mounted and said sleeve has secured thereto as by means of a key 30 the worm 9 which meshes with the worm wheel 5 of the other standard.

The crank 10 is rotatably mounted on the shaft 6 preferably between the ratchet wheels 12 and 13 which are fixed respectively to the shaft 6 and sleeve 8, the ratchet wheel 12 being fixed against rotation on the shaft 6 as by means of a key 12ª and the ratchet wheel 13 being preferably formed integral with the sleeve 8. The pawls 11 and 11ª are mounted on a common pivot 31 carried by the crank 10 and respectively engage with the ratchet wheels 12 and 13. Said pawls are of the double finger type arranged to be manually swung into engagement with the ratchet wheels to operatively engage therewith in either direction of movement of the crank, and, of course, each of the pawls may be swung into neutral position. By this construction and arrangement, it will be apparent that by manipulating the pawls 11 and 11ª, the standards may either be operated independently of each other or may be operated simultaneously. Thus, when it is desired to support the trailer upon ground which is uneven at opposite sides of the trailer, the standards may be operated to equally support the opposite sides of the trailer frame in level position.

After the forward end of the frame 1 of the trailer has been mounted upon the rear end of the drawing unit, the standards may be operated by properly manipulating the pawls 11 and 11ª to raise the lower ends of the standards out of engagement with the ground. Thereupon they may be swung into inoperative position by means of a pair of chains 32 wound upon a pair of winding drums 33 supported by the frame. For this purpose, the lower ends of the outer sections of the standards are provided with perforated ears 34 to which one end of the chains are connected and the winding drums are fixed upon the opposite ends of a transverse shaft 35 and have the other ends of the chains secured thereto. The shaft 35 is mounted in bearing blocks 36 carried at opposite sides of the frame, and a crank 37 is fixed on one end of said shaft 35 whereby the shaft may be operated to rotate the drums and wind or unwind the chains. A pawl 38 is pivoted to the side of the frame adjacent one of the drums and is arranged to engage with teeth 39 on said drum to hold the drums against rotation when the chains are wound thereon, and thus to support the standards in inoperative position.

While I have herein disclosed the preferred embodiments of my invention in considerable particularity for the sake of clearness, I recognize that various alternatives will occur to persons skilled in this art, and I, therefore, do not confine my invention to the present disclosure, but aim to cover in the appended claims all modifications and equivalents falling within the scope of the invention.

I claim as my invention:

1. In combination with a trailer truck comprising a frame mounted upon a single pair of wheels, a standard at each side of the frame comprising an outer section connected with the frame, an inner section slidable within the outer section, a worm wheel threaded on the inner section and rotatably mounted within the outer section, an operating shaft having a worm on each end meshing with said worm wheels of said standards, a crank rotatable on the shaft, and pawl and ratchet mechanism arranged to lock the crank against movement relative to either or both of said worms.

2. In combination with a trailer truck comprising a frame mounted upon a single pair of wheels, a standard at each side of the frame including two sections one movable longitudinally within the other, and a worm wheel having threaded engagement with one section and fixed against longitudinal movement relative to the other section, an operating shaft having a worm fixed thereon and meshing with the worm wheel of one standard, a second worm rotatable on the shaft and meshing with the worm wheel of the other standard, a crank rotatable on said shaft, and pawl and ratchet mechanism arranged to lock the crank against movement in either direction with reference to the shaft and the fixed worm or to the rotatable worm.

3. In combination with a trailer truck comprising a frame mounted upon a single pair of wheels, a standard at each side of the frame including two sections, one movable longitudinally within the other, a worm wheel having a threaded engagement with one section and fixed against longitudinal movement relative to the other section, an operating shaft having a worm fixed thereon and meshing with the worm wheel of one standard, and a sleeve rotatable on the shaft and having a worm fixed thereon and meshing with the worm wheel of the other standard, a ratchet wheel fixed on the shaft, a second ratchet wheel fixed on the sleeve, a crank rotatable on the shaft between said ratchet wheels, and a pair of pawls pivoted on the crank and arranged to be moved independently into operative engagement with the ratchet wheels to lock the crank against movement with reference thereto in either direction.

4. In combination with a trailer truck frame, a pair of standards pivotally attached to said frame, each standard including a screw and nut and manual means carried solely by the standards for producing any desired relative rotation of one screw and nut, or of both screws and nuts simultaneously.

5. In combination with a trailer truck, a pair of standards pivoted to the trailer frame, each standard comprising a tubular member and a telescoping screw, a foot plate carried by the lower end of each screw, a shaft extending across between the standards, a worm associated with one standard and rigidly connected with the shaft, a worm associated with the other standard and free to rotate on the shaft, operative connections between said worms and said screws, a hand lever mounted on said shaft, and having means to prevent its rotation thereon, and means for engaging said hand lever at will with said free worm.

6. In a trailer truck, the combination of a frame having a pair of extensible supporting standards pivotally mounted upon opposite sides thereof, unitary means mounted on the standards and manually operable from one side of said frame to extend and retract said standards either separately or simultaneously, and means mounted on said frame, and manually operable from the same side as said standard-operating means to swing said standards into and out of operative position.

7. In a trailer truck the combination of a frame having a pair of extensible supporting standards pivotally mounted upon opposite sides thereof, each of said standards having a pair of co-acting gear elements operable to extend and retract the standards, an actuating element for each of the standards coacting with one of said gear elements, a pair of rotatable elements each having fixed thereon one of said actuating elements and both extending to one side of the truck frame, and means at said side of the frame operable to rotate said rotatable elements either independently or simultaneously.

8. In a trailer truck, the combination with a frame, a pair of extensible standards pivotally mounted at opposite sides of the frame each of said standards having means operable to extend and retract the standards, and means carried solely by the standards and operable from one side of the frame to actuate said operating means of the two standards either independently or simultaneously.

9. In a trailer truck, the combination with a frame, of a pair of extensible standards each having operating means including a rotatable gear element, a pair of rotatable elements each operatively associated with one of said gear elements, and actuating means for selectively rotating said rotatable elements, one of said rotatable elements being in the form of a shaft extending from the standard with which it is operatively connected to the opposite side of frame and said actuating means being mounted on the free end of the shaft element.

10. In a trailer truck the combination with a frame, of a pair of extensible standards, means for operating the standards including a pair of coaxial elements each operatively associated with one of the standards and one of said elements being in the form of a shaft extending from the standard with which it is operatively associated to a point beyond the other standard, and means carried by said shaft element adapted to selectively actuate it or the other rotatable element.

In testimony whereof, I have hereunto set my hand.

ADDI BENJAMIN CADMAN.